Sept. 26, 1961 J. L. SAFFER 3,001,756
ADJUSTABLE SEAT MOUNT
Filed June 1, 1959 3 Sheets-Sheet 1

INVENTOR.
John L. Saffer.
BY Harness and Harris
ATTORNEYS.

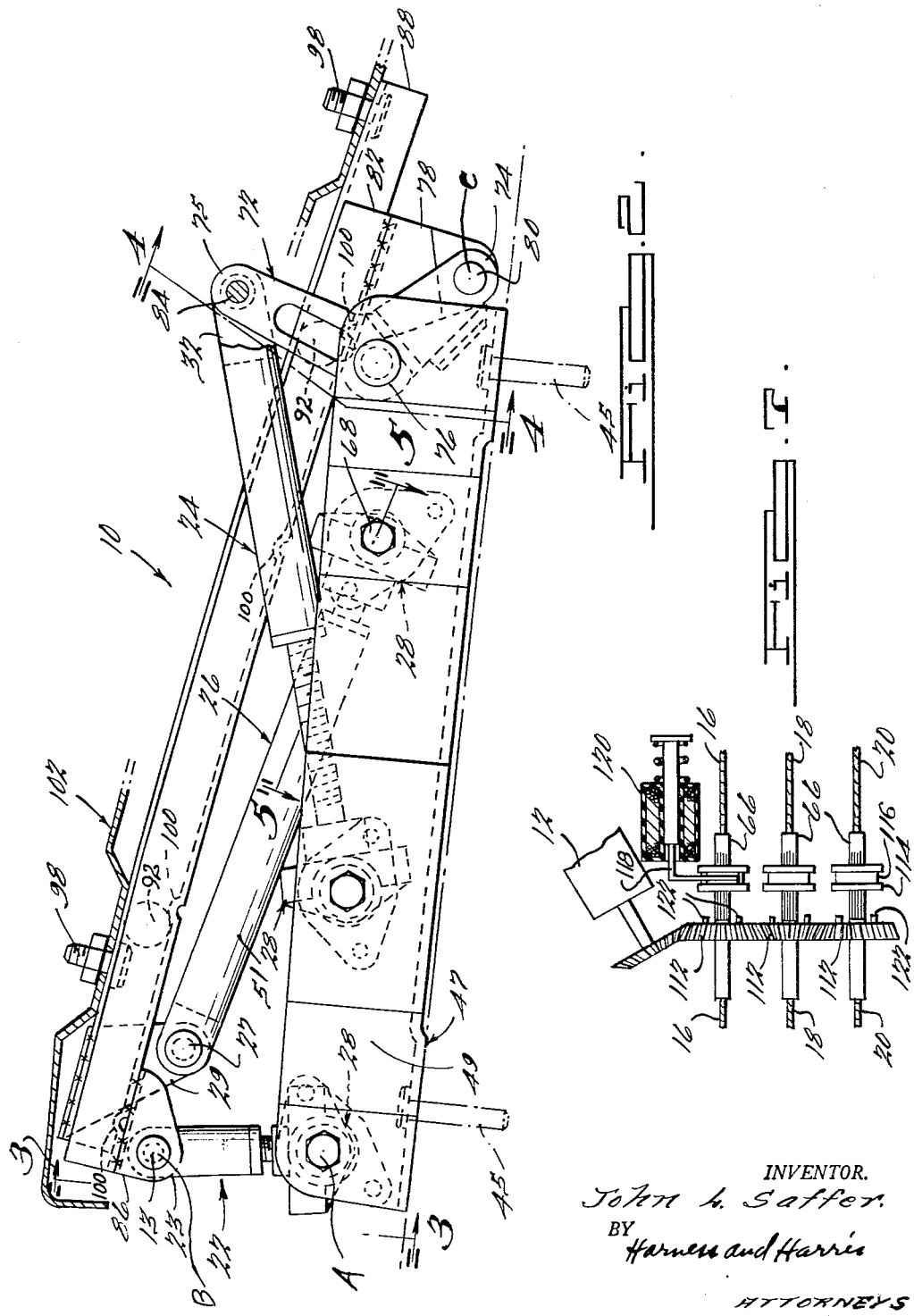

Sept. 26, 1961   J. L. SAFFER   3,001,756
ADJUSTABLE SEAT MOUNT
Filed June 1, 1959   3 Sheets-Sheet 3
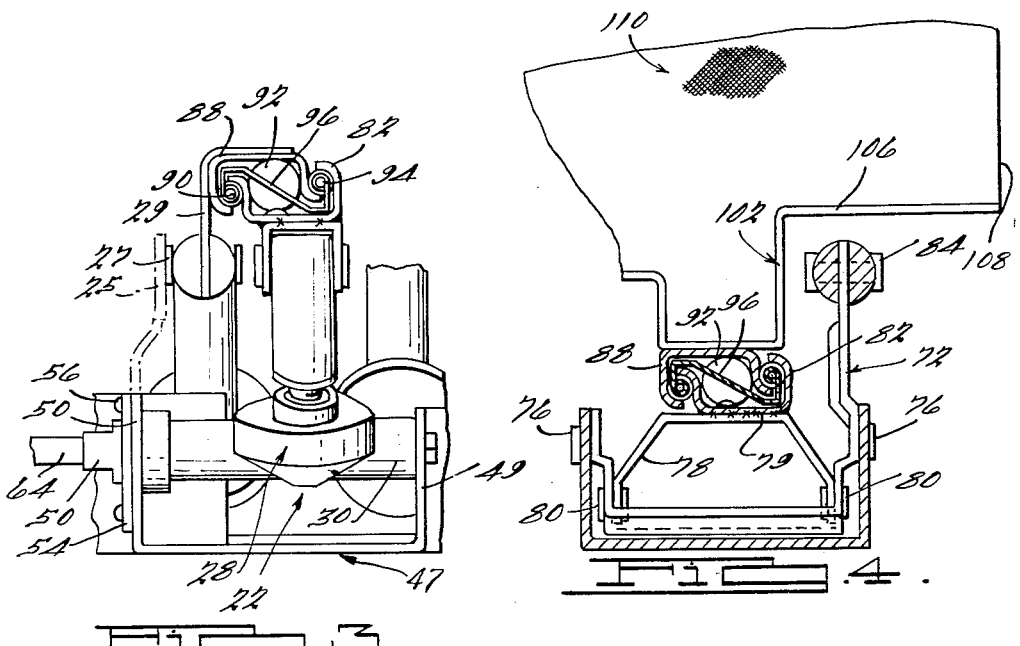
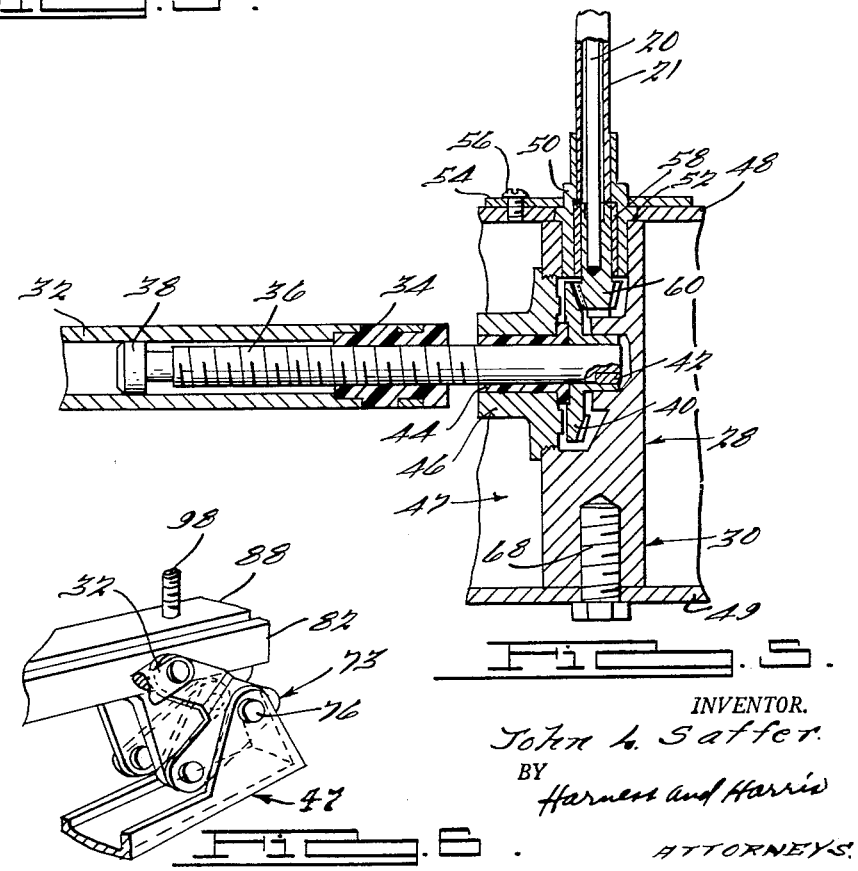
INVENTOR.
John L. Saffer.
BY
Harness and Harris
ATTORNEYS.

United States Patent Office 3,001,756
Patented Sept. 26, 1961.

3,001,756
ADJUSTABLE SEAT MOUNT
John L. Saffer, Madison Heights, Mich., assignor to Chrysler Corporation, Highland Park, Mich., a corporation of Delaware
Filed June 1, 1959, Ser. No. 817,291
6 Claims. (Cl. 248—394)

This invention relates to a power actuated seat mount providing front and rear vertical adjustment and horizontal adjustment to seats of the type presently used in automobiles and other conveyances.

In power seat units heretofore and presently employed, particularly on some automobiles, considerable space underneath the seat is required to house all of the mechanical linkage structure necessary to provide proper vertical and horizontal adjustment of the seat. This space which normally could be used for seat cushioning has to be utilized for the mechanical structure.

The present invention utilizes a minimum of space for its compact mechanical structure with increased effectiveness and without any loss of degree of adjustment. In order to eliminate the greater size of the conventional power structure, applicant has devised several unique features, among which are a rearwardly sloping seat support slide means upon which the lower seat frame is mounted, bellcrank means positioned at infrequently used parts of the seat, triangularly located pivot points for the power and supporting linkages for increasing the overall strength and rigidity of the mount structure and thereby eliminating extraneous strengthening brackets and rods, and a freely movable upper slide member which can move relatively to a lower slide member as the necessary front and rear vertical adjustments of the seat are accomplished to eliminate any tendency of the adjusting device to bind due to shortening or lengthening of the distance between pivot points.

A principal object of this invention is to provide a low cost, compact power device for use in automobiles and in other places where seat structure must be of at least certain bulk and wherein the power structure must be of or below a maximum size.

A specific object of this invention is to provide a seat adjusting power structure which incorporates relatively movable upper and lower slides and a permanently secured base.

Another specific object is to locate the power actuating devices and linkages of the seat adjusting mechanism so that they shall have increased adjusting effectiveness and not interfere with one another and the seat structure itself during their operation.

A further specific object is to provide side wall structure on the aforesaid device which acts as bearing surfaces for the power linkages and serves to rigidify the device.

Further objects and advantages will become apparent from the following description and drawings, in which:

FIGURE 2 represents a side elevational view of one of the power units of FIGURE 1 taken along the line 2—2 thereof in the direction of the arrows;

FIGURE 3 represents an end view of the power unit of FIGURE 2 taken along the line 3—3 thereof in the direction of the arrows;

FIGURE 4 represents a cross sectional view of the unit of FIGURE 2 taken along the line 4—4 thereof in the direction of the arrows;

FIGURE 5 represents a cross sectional view of one of the screw jacks of FIGURE 2 taken along the line 5—5 thereof in the direction of the arrows;

FIGURE 6 represents a modification of the bellcrank structure of FIGURE 2; and

FIGURE 7 represents a schematic view of the transmission mechanism for selectively actuating the screw jack drive cables.

Figure 1:
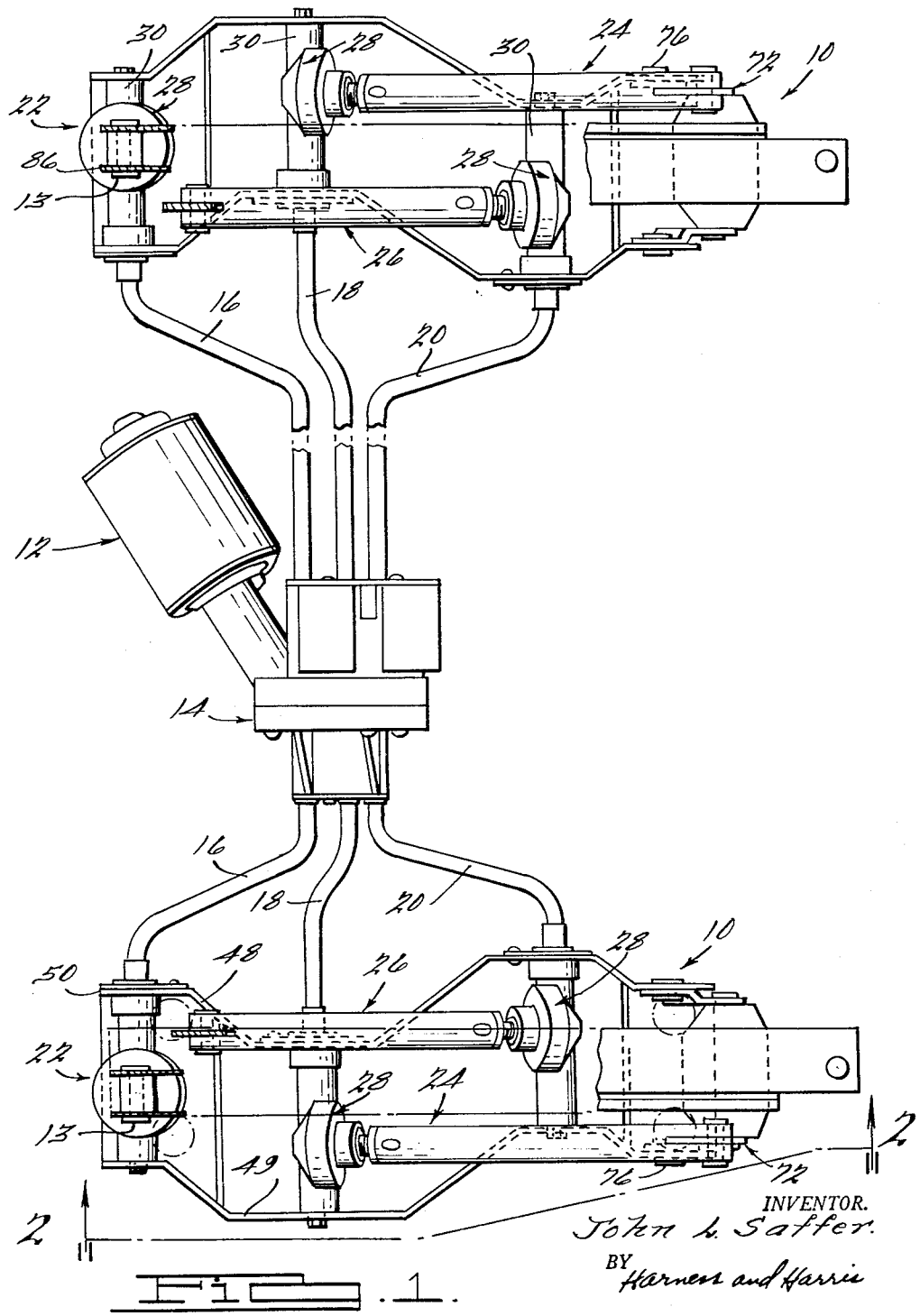
FIGURE 1 represents a top plan view of a seat adjusting power device embodying the present invention.

Referring to FIGURE 1 of the drawings a power unit 10 is provided for each end of a seat (not shown) and the power thereto is provided by means of motor 12, transmission 14, and drive cables 16, 18, and 20. Each of these drive cables extend completely through the transmission and power identical pairs of screw jacks in the power units 10. Each of the power units 10 is provided with a forward vertical adjustment screw jack 22, a rearward vertical adjustment screw jack 24, and a horizontal adjustment screw jack 26. Each of these jacks is provided with a gear housing 28 and a gear housing support 30 which support is quite sturdy and in cooperation with the sides of the power unit base provides a pivotal connection having very little side or lateral play.

The specific structure of the screw jacks is shown in FIGURE 5 and comprises an actuator sleeve 32 in one end of which is either molded or cast a sleeve nut 34 with threads on the inside cooperating with threads on the exterior of a power screw 36 which is threadedly mounted in the nut 34 and is provided at its upper end with a screw head bearing 38 and at its lower end with a bevel drive gear 40 by means of a key 42. Power screw 36 is rotatably mounted in the screw bushing 44 which is retained in gear housing 28 by means of a bushing retainer 46 threadedly received in a portion of the gear housing 28. Inserted through the side wall 48 of the base 47 is a pinion gear support 50 which is locked in place by an end 52 of the gear housing support 30 and by a pinion gear retaining plate 54 which is attached by screws or other means 56 to the side wall 48 of the base. Support 50 is provided internally with a bushing 58 which rotatably receives the pinion drive gear 60 which is immovably secured to the drive cable 20 rotatably mounted inside of a drive cable sheath 21. The drive cables are shown in FIGURE 7 and are connected to the drive shafts 66 within the transmission 14. The gear housing support 30 is locked in place between the side walls 48 and 49 of the base by means of a retaining bolt 68. As drive cable 20 rotates in a clockwise direction as viewed from FIGURE 5, the screw 36 will be rotated counterclockwise and sleeve 32 will move to the left. Rotation of cable 20 in a counterclockwise direction will move sleeve 32 to the right. The direction of rotation of cable 20 is selected by the operator.

Each of the power units 10 as shown in FIGURES 2 through 4 are comprised of a base 47 having opposing side walls 48 and 49 extending upwardly therefrom. Base 47 has a tortious configuration to allow the side-by-side arrangement of the screw jacks. Stud means 45 immovably secure base 47 to the vehicle floor. Located at the rear of each power unit is a bellcrank 72 comprising two arm portions 74 and 75 which are integral with each other and pivotally mounted on and between the side walls 48 and 49 by means of pivot studs 76 in each wall. Arm 74 of bellcrank 72 is pivotally connected to a bracket 78 by means of pivot studs 80 secured to each depending leg of bracket 78 and this bracket is welded or otherwise secured at 79 to the lower slide member 82 of the power unit. Arm 75 of bellcrank 72 is pivotally connected to the end of actuator sleeve 32 of screw jack 24 by means of the pivot stud 84. Screw jack 22 is pivotally mounted on and between the side walls 48 and 49 of base 70 and has its actuator sleeve 23 pivotally connected to the depending legs of a U-shaped bracekt 86 fixed by welding or other means to the lower slide 82. Mounted on lower slide 82 is an upper slide 88 which has a shape complementary to slide 82 and nests therein and rides upon two sets of ball bearings, each set comprising bearings 90, 92 and 94 which are contained in a floating retainer member 96 so that all of these bearings roll along the slides together. The limit of movement of these ball bearings is defined by the heads of depending screws 98 located at either end of the upper slide member 88 and by projections 100 extending up from the bottom of the lower slide member 82. Screws 98 further serve to provide a connecting means for the seat frame 102. Screw jack 26 also has its gear portion pivotally connected between walls 48 and 49 of the base and has its actuator sleeve 51 pivotally connected to the depending leg of a bracket 29 by pivot stud 27. Bracket 29 is secured to upper slide 88 to move the same with respect to slide 82 in response to movement of any or all of the screw jacks for a purpose described below.

Referring to FIGURE 4 it is noted that the seat frame 102 has its outside portion 106 extending over the top of the bellcrank 72 near the outer edge 108 of the seat cushion or topper pad 110. This arrangement allows freedom of movement of the bellcrank 72 without sacrificing any of the critical pad thickness in the vicinity of where an operator or passenger of an automobile shall normally sit.

Referring to FIGURE 6 it is noted that the bellcrank 73 instead of facing rearwardly as does bellcrank 72, faces forwardly to provide a modified structure should a space problem exist at the rear end of the power unit.

Referring to FIGURE 7 it is seen that the transmission 14 consists of three shafts 66 which connect to the drive cables 16, 18, and 20. These shafts are rotatably mounted in the bevel gears 112 but are non-rotatably fixed to the clutch plates 114. These clutch plates are provided with slots 116 in which the legs of actuator yokes 118 rest. One such yoke 118 and an actuator solenoid 120 is provided for each of these clutch plates 114 to provide selective driving thereof. As the proper signal is transmitted by the operator to the motor 12 and transmission 14 to adjust the seat, the particular solenoid actuated shall move its clutch plate into engagement with the dogs 122 located on the face of its cooperating bevel gear 112 and at the same instant the forward or reverse type motor 12 will begin to rotate intermeshing gears 112 in the particular direction desired, either forward or reverse, to rotate the particular clutch plate 114 and the particular shaft 66 connected thereto to move one of the drive cables 16, 18 or 20, which drive cables then actuate the screw jack associated therewith either to shorten or elongate the same to adjust the seat position according to the operator's wishes. In the arrangement shown the screw jack 24 would have threads of an opposite direction to those of jacks 22 and 26.

It is seen in the operation of the device that movement of the actuator sleeve 23 of screw jack 22 will move the front end of the lower slide 82 in an arc with the pivot point thereof being at 80 the point of connection of the bellcrank 72 with the U-shaped bracket 78 attached to the lower slide 82. The rear portion of the slide 82 is vertically adjustable by the operation of jack 24 which rotates bellcrank 72 either clockwise or counterclockwise about pivot 76 to respectively lower and raise the rear portion of the seat. Since the upper slide 88 is movably mounted on the lower slide it may move therealong to compensate for the movement of the lower slide relative to the pivot points of the screw jack 26 as the lower slide is positioned by jacks 22 and 24. In this way the binding effect produced by the arcing motion of the lower slide is avoided. It is also noted that the positioning of the screw jack 26, that is, from rear to front allows vertical adjustment of the seat to occur without interfering with the mechanism for moving the seat rearwardly or forwardly. It is pointed out that upon movement of any of the screw jacks to adjust the position of the seat the relationship of the linkages supporting the lower slide 82 is such that two of the four pivot points involved are rigidly attached to the base 47. For example, when the forward end of the seat is raised or lowered four slide supporting pivot points come into play, that is, A, B, C, and 76, and two of them are solidly connected to the base. Again when the upper slide 88 is actuated to move either back or forth by means of screw jack 26 there is virtually no movement of any of the pivot points. Because of this type of pivotal structure the pivots can be made sufficiently strong by connecting four of them securely to the base 47 to withstand any significant lateral motion of the seat and allow thereby the elimination of the cross supports normally used to prevent such motion. Moreover, the sides of the base 47 may be built up wherever and as high as is necessary to obtain the structural rigidity of the whole unit required for preventing any substantial transverse movement of the seat. For example, referring to FIGURE 3, the sides of the base 47 could actually extend up as shown by the dotted line 25 to bear against the outside of the pivot pin 27 which connects the bracket 29 to the upper slide 88 and thereby provide a bearing surface for the upper slide and the actuator sleeve of the screw jack to further reduce the tendency of the seat to move laterally and be unstable.

I claim:

1. A seat adjusting mechanism comprising a channel shaped base, seat supporting means, first power jack means having its power intake end pivotally mounted on the forward end portion of said base between the sides thereof and having its extensible end pivotally connected to the forward end portion of said seat supporting means, said first power jack means providing the main vertical support for the front end portion of said supporting means, bellcrank means pivotally mounted between the sides of said base on the rear of said base and having one arm pivotally connected to said seat supporting means and having another arm pivotally connected to a second power jack means, said second jack means being also pivotally connected between the sides of said base to said base.

2. A seat adjusting mechanism comprising a base, means on said base for immovably securing the same to the floor of a vehicle, a lower slide and an upper slide, said slides being relatively movable on bearing means therebetween, first power jack means having its power intake end pivotally mounted on the forward end portion of said base and having its extensible end pivotally connected to the forward end of said lower slide, said first power jack means providing the main vertical support for said forward end of said lower slide, bellcrank means pivotally mounted on the rear of said base and having one arm pivotally connected to said lower slide and having another arm pivotally connected to a second power jack means, said second jack means being also pivotally connected to said base.

3. A seat adjusting mechanism comprising a base, means on said base for immovably securing the same to the floor of a vehicle, a lower slide and an upper slide, said slides being relatively movable on bearing means therebetween, first power jack means pivotally mounted on the forward end of said base and pivotally connected to the forward end of said lower slide, bellcrank means pivotally mounted on the rear of said base and having one arm pivotally connected to said lower slide and having another arm pivotally connected to a second power jack means, said second jack means being also pivotally connected to said base, and third power jack means pivotally secured to said base and to said upper slide for moving said upper slide with respect to said lower slide.

4. A seat adjusting mechanism comprising a base, a lower slide and an upper slide, said slides having a movable bearing connection therebetween, first power jack means pivotally mounted on the forward end of said base and pivotally connected to the forward end of said lower slide, bellcrank means pivotally mounted on the rear of said base and having one arm pivotally connected to said lower slide and having another arm pivotally connected to a second lower jack means, said second jack means being also pivotally connected to said base, third power jack means pivotally connected to said base near the rear end thereof and to said upper slide near the forward end thereof, said jack means being adapted for selective actuation.

5. In a power seat adjusting unit having a power actuated adjusting mechanism adjacent each end of said seat, each said seat adjusting mechanism comprising a base, seat supporting means, first power means having a power intake portion and a force transmitting portion extensible therefrom, said power intake portion being pivotally connected to said base and said force transmitting portion being pivotally connected to one end portion of said seat supporting means, said first power means providing the main vertical and horizontal support for said one end portion of said supporting means, second power means, bellcrank means pivotally connecting the other end portion of said seat supporting means to said second power means and providing the main vertical support for said other end portion, and drive means operatively connected to each of said power means in each said adjusting mechanism and being operable to transmit power selectively to each of said power means, said drive means comprising an electric motor and a transmission having selectively operable clutch means.

6. A seat adjusting mechanism comprising a base having means thereon for securing the same to the floor of a vehicle, a lower slide and an upper slide, said slides being relatively movable so as to allow fore and aft adjustment of the seat, first power means having a power intake portion and a force transmitting portion extensible therefrom, one of said portions being pivotally connected to said base adjacent its forward end and said other portion being pivotally connected to said lower slide adjacent its forward end, bellcrank means pivotally mounted on the rear of said base and having one arm pivotally connected to said lower slide and its other arm pivotally connected to second power means, said second power means being pivotally connected to said base, and third power means pivotally secured to said base and to said upper slide for moving said upper slide relatively to said lower slide.

References Cited in the file of this patent

UNITED STATES PATENTS

| | | |
|---|---|---|
| 2,820,506 | Duluk | Jan. 21, 1958 |
| 2,839,124 | Desmond | June 17, 1958 |
| 2,886,094 | Pickles | May 12, 1959 |

UNITED STATES PATENT OFFICE
CERTIFICATE OF CORRECTION

Patent No. 3,001,756                          September 26, 1961

John L. Saffer

It is hereby certified that error appears in the above numbered patent requiring correction and that the said Letters Patent should read as corrected below.

Column 5, line 2, for "lower" read -- power --.

Signed and sealed this 13th day of March 1962.

(SEAL)
Attest:

ERNEST W. SWIDER                          DAVID L. LADD
Attesting Officer                             Commissioner of Patents